United States Patent [19]
Jarret et al.

[11] 4,227,142
[45] Oct. 7, 1980

[54] PULSED EXCITATION ALTERNATOR

[76] Inventors: Jacques H. Jarret, 11 rue des Chenes, Le Vesinet, Yvelines; Jean M. B. Jarret, La Champanelle, Chemin du Clos Baron, Fourqueux, Yvelines, both of France

[21] Appl. No.: 942,862

[22] Filed: Sep. 15, 1978

Related U.S. Application Data

[63] Continuation of Ser. No. 693,646, Jun. 7, 1976, abandoned.

[30] Foreign Application Priority Data

Jun. 9, 1975 [FR] France ................. 75 17905

[51] Int. Cl.³ .................. H02K 35/00; H02P 9/00
[52] U.S. Cl. .................................. 322/3; 310/15; 322/49; 322/52; 322/100
[58] Field of Search ............... 322/3, 49, 100, 46, 322/50-52; 320/14, 21, 61; 310/15, 17, 111

[56] References Cited

U.S. PATENT DOCUMENTS

| 2,607,813 | 8/1952 | Reijnst ........................ 322/100 |
| 2,609,411 | 9/1952 | Reijnst et al. .................. 322/100 |
| 3,611,091 | 10/1971 | Genovese ...................... 320/21 X |

Primary Examiner—Robert J. Hickey
Attorney, Agent, or Firm—Browdy and Neimark

[57] ABSTRACT

Alternator having a pulsed excitation. Means are provided to supply short current pulses into the pick-up coils at a suitable time so to magnetize the circuit. As a consequence the shape of the magnetic circuit can be simplified and the weight of iron and copper can be reduced.

11 Claims, 9 Drawing Figures

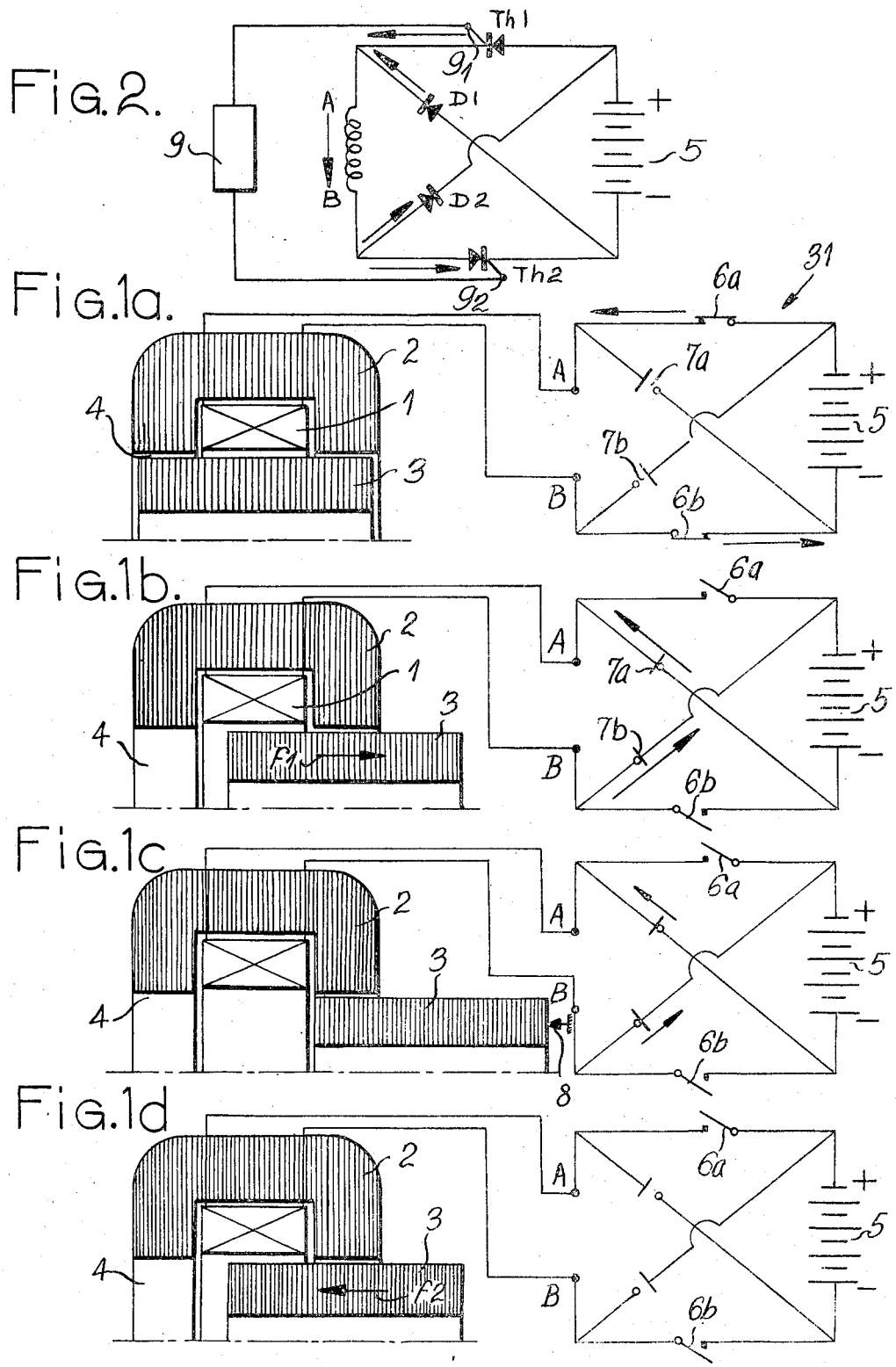

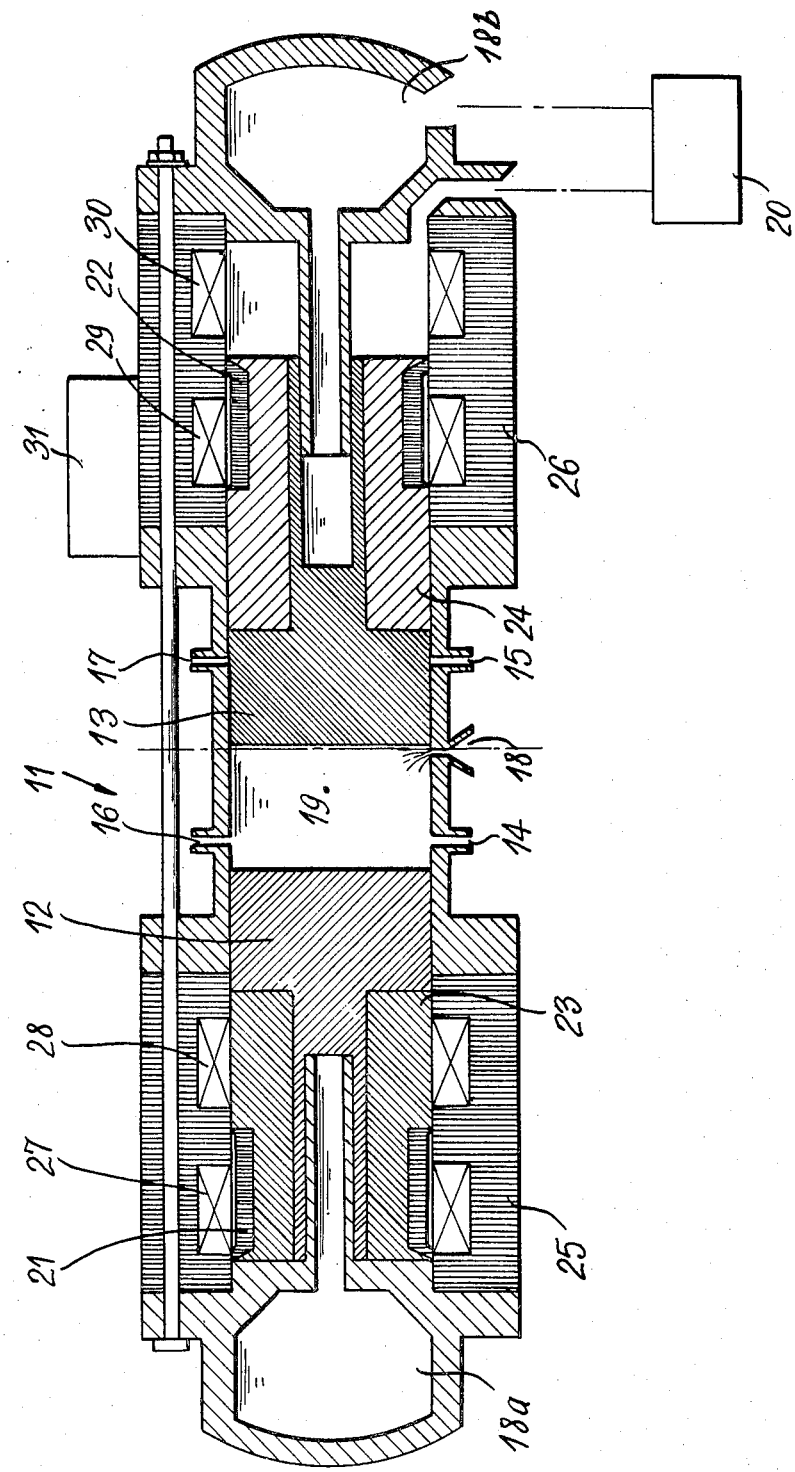

PULSED EXCITATION ALTERNATOR

This is a continuation of application Ser. No. 693,646 filed June 7, 1976, now abandoned.

This invention relates to a pulsed excitation alternator, and applies in particular to rectilinear free-piston alternators, i.e. to free piston alternators in which the cross-section of the moving parts remains constant all along the length of the alternator.

It is known that in some heat engines, generally without rod systems, the reciprocating motion of a piston can be used to transform a mechanical energy originating from the release of burnt gases, into electrical energy by means of a rectilinear free-piston alternator including a moving part fixed to a piston and a stationary part fixed to a cylinder and inside which is moving the piston.

In French Pat. No. 69 42 152, filed Dec. 5, 1969, there has already been described a rectilinear alternator having a moving part comprising a ring made of laminated ferromagnetic material, the stationary part being an inductor formed by a circuit also made of laminated ferromagnetic material and provided with coils. The displacement of the moving ring in the stationary circuit, crossed by a magnetic flux, causes variations of the reluctance which is opposed to the passage of the flux and which consequently makes the flux to vary inside the coils. These variations of flux induce, in the coils, eletromotive forces which permit to supply an electric current under voltage into a utility network connected to these coils.

To produce such a variable reluctance electrical machine, use is generally made of magnetic circuits provided with an excitation coil and a pick-up coil. A constant current flows in the excitation coil that generates an average magnetic flux modulated by the variations of the reluctance. In order that energy brought to the system by the displacement of the moving parts be not sent back onto the excitation source, the excitation coil must surround several magnetic circuit elements in which the variation of flux are such that the algebric sum of the flux is constant, while a pick-up coil is placed on each circuit element to supply electrical energy to be used outside of the machine.

A structure of this type involves some geometric complexity in the circuits which requires the use of an important weight of iron and copper to manufacture the stationary part of the alternator. Thus, in a heat engine having an electromagnetic drive and no rod system, the inductor weight can represent the three quarters of the whole weight of the engine.

Moreover, the own inductance of an alternator of the above-mentioned type, and possibly the inductance of the utilization circuit, will tend to change the phase of the electric current, flowing through the coils, with respect to the motion of the moving parts. This phase shift contributes to reduce the energy transfer from the engine or requires the use of large and expensive compensating capacitors, which increases the engine cost.

The invention has for its object to solve the above problem and in particular to reduce the weight and cost of such rectilinear alternators.

According to the invention, the method for exciting alternators comprises applying short current pulses into the pick-up coils at a suitable time so to magnetize the circuit, these pulses being applied through a convenient electronic device. This pulsed excitation does not require that the sum of fluxes circulating through the circuit remains constant. As a consequence, the shape of the magnetic circuit can be simplified and the weight of iron and copper can be reduced.

The invention also relates to a device carrying out the above method.

According to this second feature of the invention, the alternator comprises at least one coil surrounded by a magnetic circuit cooperating with a moving part cyclically displaced between two positions to form a gap having a size variable in function of the displacements of said moving part, ends of the coil being connected respectively to positive and negative terminals of a substantially constant voltage power supply source through two controlled valves such as transistors or thyristors; monodirectional links, such as diodes, being moreover provided between each end of the coil and opposite terminal of the power supply source.

Various other features will moreover appear from the following detailed description.

Embodiments of the invention are shown, by way of non-limitative examples, in the accompanying drawings, in which:

FIGS. 1a–1d diagrammatically represent four typical positions of a machine according to the invention, the machine being assumed to consist only of one coil surrounded by a magnetic circuit in the center of which a movable core is moving;

FIG. 2 is an electronic diagram corresponding to FIGS. 1a–1d;

Figure 3:
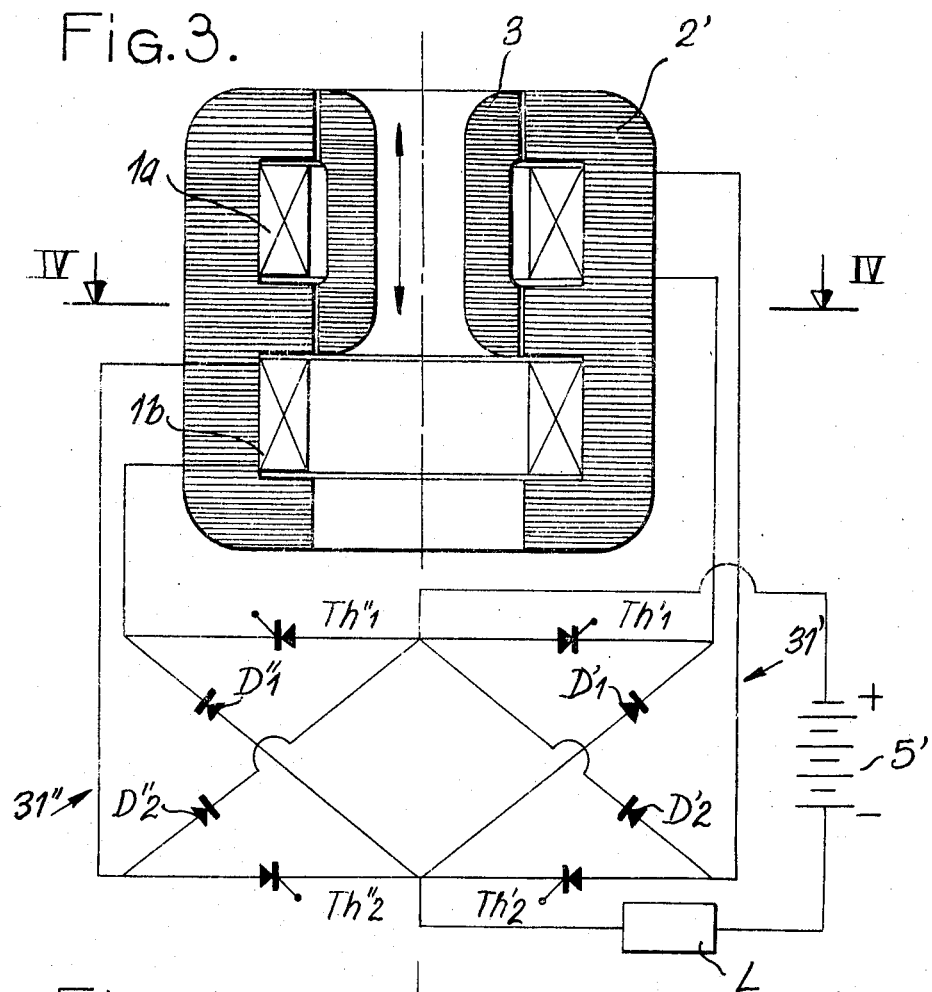
FIG. 3 is a diagrammatic representation of a machine according to the invention, with two coils placed in parallel in notches of the magnetic circuit.

FIGS. 5a and 5b respectively shows half of a cross-sectional elevation view of a machine according to the invention, each in a typical position of the machine.

Referring now to the drawings, there is shown in FIGS. 1a–1d, a partial diagrammatic view of an alternator according to the invention in four typical operating positions. Each coil 1 is surrounded by a magnetic circuit or inductor 2, made of iron sheets and which defines, in cooperation with a moving part or piston 3, a gap 4 having a size varying with the displacements of the moving part 3 which is also made of laminated iron sheets.

The two ends of the coil 1 are respectively connected with terminals A and B of an excitation device 31. The A and B terminals of the device 31 are respectively connected with the negative and positive terminals of a substantially constant voltage power supply source, shown as a battery 5. The respective terminals A and B are connected to the battery 5 through two controlled valves, shown in the drawings as mere switches 6a and 6b. Moreover, monodirectional links 7a and 7b are diagrammatically represented by a dash and a point which, when the junction is not conductive, are shown spaced apart; said links 7a, 7b are provided between the terminals A and B and the opposite terminal of the power supply source respectively.

When studying a cycle of the movement of the moving part, i.e. a forward motion and a backward motion of the piston 3, the operation of the alternator can be divided into four periods, respectively represented in FIGS. 1a–1d.

In FIG. 1a, which shows the initial state of the first period of the cycle, the gap 4 has its minimum size, the moving part 3 being substantially stationary at the end of its path. The controlled valves 6a, 6b are conductive until the magnetic flux in the magnetic circuit 2 has reached its maximum value, the monodirectional links 7a, 7b being then non-conductive and preventing the current to flow between the ends of the coil 1 and the opposite terminal of the power supply source 5.

In FIG. 1b which shows the second period of the cycle, the valves 6a and 6b are controlled in their non-conductive state, while the moving part 3 is moving in the direction of the arrow $f_1$ which increases the gap 4. The flux is reduced by variation of the reluctance which generates an electromotive force higher than the voltage of the source 5. The current which remains in the same direction as during the preceding period, flows through the monodirectional links 7a and 7b and delivers the effective power of the machine.

In FIG. 1c, which represents the initial state of the third period of the cycle, the moving part 3 gets stationary at the other end of its path by coming against a reversing stop 8. The gap 4 is then at its maximum value. The values 6a and 6b remain controlled in their non-conductive state. The current decreases and is abruptly interrupted when the motion of the moving part 3 reverses by reacting against the stop and a counter-electromotive force opposes to the flowing of this current.

In FIG. 1d which represents the fourth period of the cycle, the moving part 3 is moving in the direction of the arrow $f_2$ and is reducing the gap 4. The current remains interrupted until the valves 6a and 6b are controlled to their conducting state, which occurs at the end of the stroke, i.e. at begining of the first period of the next cycle when the whole unit returns to the positions of FIG. 1a.

During each cycle, the amount of transfered useful energy corresponds:

(i) to the product of the variation of flux obtained during the second period of the cycle (FIG. 1b) times the average number of ampere-turns flowing in the coil during this period;

(ii) to the product of the average magneto-mechanic force, applied continuously during this half-period between the moving part 3 and the inductor 2 in the direction of the motion, times the length of the stroke of the moving part.

FIG. 2 shows an electronic diagram corresponding to FIGS. 1a–1d. In FIG. 2, the controlled valves 6a and 6bare respectively represented by two thyristors Th1 and Th2, the monodirectional links 7a and 7b being respectively represented by two diodes D1 and D2. In this Figure, the arrows indicate the normal direction of the current flow.

The gates g1 and g2 of thyristors Th1 and Th2 are connected to a device 9 which controls the conducting state of the thyristors Th1 and Th2 as stated above for the controlled valves 6a and 6b.

The duration of the excitation pulse controlled from the device 9 corresponds to about 1 to 10% of the total length of a cycle. The device 9 sets the begining of the pulse in such a way that the useful current flowing through the coil is in phase, in the best conditions, with the variation of reluctance caused by the displacement of the moving part.

Figure 4:
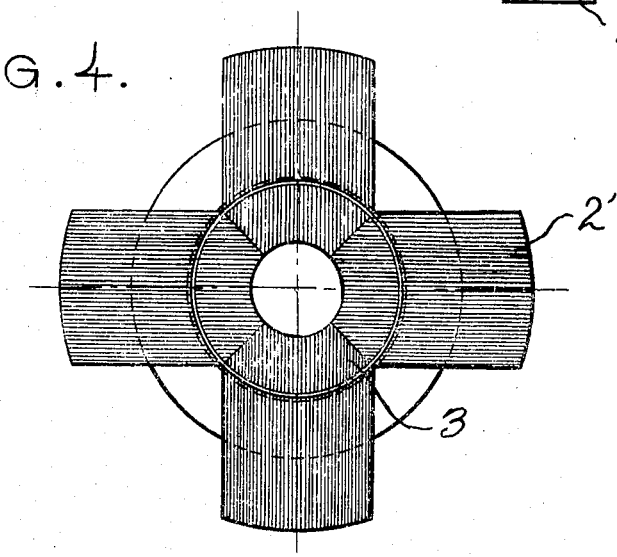
FIG. 4 is a cross-sectional view of FIG. 3 taken substantially along line IV—IV in this figure.

As shown in FIGS. 1a–1d, the alternator may include only one coil. However, it is often advantageous, as shown in FIGS. 3 and 4, to place two coils 1a and 1b of notches in a magnetic circuit 2', in the middle of which moves the moving part 3, the two coils 1a and 1b being installed in parallel in these notches so that the second period of the cycle (shown in FIG. 1b) in one of the coils corresponds to the fourth period (shown in FIG. 1d) in the other coil. The aim is actually to obtain a better continuity of the supplied current by picking mechanical energy from the moving part 3, ducing both the forward and the backward motions of its reciprocating movement so that the resulting current is never cancelled and remains substantially constant.

FIG. 3 then shows the two ends of the coil 1a respectively connected (by means of a device 31' similar to the device 31 of FIGS. 1a–1d) to the positive and negative terminals of a constant voltage power supply source 5' through two thyristors Th1 and Th2, links being also provided through the diodes D'1 and D'2 between each end of coil 1a and the opposite terminal of the power supply source. In the same manner, the two terminals of the coil 1b are connected (through a device 31'') respectively to the positive and negative terminals of the power supply source 5', through two thyristors Th''1 and Th''2, links being also provided through the diodes D''1 and D''2 between each end of coil 1b and the opposite terminal of the power supply source.

The embodiment of FIGS. 3 and 4 thus provides a better continuity of the current supplied to a load L, connected as shown in the source circuit, because electrical energy is generated from the mechanical energy picked from the moving part, during both the forward motion and the backward motion of its reciprocating movement.

FIGS. 5a and 5b are two partial views showing an embodiment of a machine built according to FIGS. 3 and 4. In FIGS. 5a and 5b, the machine comprises only one heat cylinder 11 in which are moving two cylindrical parts 12 and 13, each respectively similar to the moving part 3 of the preceding figures. The heat cylinder 11 has inlet openings 14 and 15 and exhaust openings 16 and 17 as well as a central injector 18. The moving parts 12 and 13 symetrically oscillate between, on the one hand, an outer dead center reached when the opposite sides of the pistons of the moving parts have compressed a liquid contained in the chambers 18a and 18b forming two hydraulic resilient reversing devices (FIG. 5a), and on the other hand an inner dead center reached when the working facing sides of the opposite pistons stop at 2 mm from each other after having compressed the fuel introduced in the middle chamber 19 of variable volume which they define (FIG. 5b), and before combustion of the fuel will send back the pistons. In the drawings, the chambers 18a and 18b containing the reversing liquid are diagrammatically represented as connected with a hydraulic liquid source 20.

Each piston 12, 13 is fitted with an annular mass of laminated iron 21, 22, inserted in a non-magnetic material 23, 24 to be displaced during the reciprocating motion of the pistons before an annular laminated inductor 25, 26 similar to the magnetic circuit 2 of the preceding figures.

As in the embodiment according to FIGS. 3 and 4 concerning the coils 1a and 1b, coils 27, 28 and 29, 30 are placed in parallel in notches of a magnetic circuit. It can be seen from the drawing that while the magnetic mass 21, associated with piston 12, is located before one of the coils 27 or 28, the non-magnetic part is located before the other coil. It is all the same for the magnetic mass 22 with respect to the coils 29 and 30.

The coils 27, 28 and respectively 29, 30 associated with the laminated masses 21 and 22 form means intended to start the machine, means to set in phase the displacements of the free pistons 12 and 13, as well as sources of electrical energy generated by the operation of the machine. Similarly to the indications given with reference to FIG. 3, the whole device is excited or energized from a device diagrammatically shown in 31, and the coils 27, 28 and respectively 29, 30 are in parallel so that the second period of a cycle in one coil corresponds with the fourth period, in the other coil.

The device as described can be utilized for the regulation of a current from a substantially constant source, and for an effective use of a buffer source.

The invention is not limited to the embodiments presented and discussed in detail and various modifications can be made without departing from its scope as shown in the accompanying claims. In particular, this invention applies to any heat machine in which the stator represents the inductor and the rotor has successive teeth corresponding to the moving parts of the described embodiments.

We claim:

1. In an alternator having at least one coil surrounded by an iron magnetic circuit for picking up electrical power from the alternator and having two ends, the coil cooperating with a magnetic moving part of iron cyclically displaced between two positions to form a gap having a size dependent on instant position of the moving part, the improvement comprising:
   a substantially constant voltage power supply source having a positive and a negative terminal;
   two controlled valves, said two ends of said at least one coil being respectively connected to said positive terminal and to said negative terminal of said substantially constant voltage power supply source through respective ones of said controlled valves; and
   monodirectional current connections between each of said two ends of said at least one coil and opposite terminal of the power supply source.

2. An improved alternator according to claim 1, wherein said controlled valves comprise thyristors.

3. An improved alternator according to claim 1, wherein said monodirectional current connections comprise diodes.

4. An improved alternator according to claim 1, including means for supplying excitation pulses to the coil during from about 1% to about 10% of the total cycle of said moving part, said means being coupled to control electrodes of said valves to control conduction thereof with said pulses.

5. An improved alternator according to claim 4, wherein said means for supplying excitation pulses comprises excitation pulse producing means for producing pulses to effect a current flow in said coil substantially in phase with variation of reluctance originating from displacement of said moving part.

6. An improved alternator according to claim 1, wherein said magnetic moving part is at least a portion of a member useable as a free piston in a free piston rectilinear machine.

7. An improved alternator according to claim 6, wherein said magnetic moving part is mounted in a non-magnetic part of said member, length of said non-magnetic part being substantially equal to that of said magnetic part.

8. An improved alternator according to claim 1, wherein said magnetic moving part is at least a portion of a member useable as a rotor of a heat engine having a stator and a rotor, said coil being useable as part of the stator and the rotor including teeth corresponding to said moving part.

9. An improved alternator according to claim 1, wherein said at least one coil comprises a first coil and a second coil placed in notches of the magnetic circuit and interconnected through a rectifier system, said moving part being operatively arranged to reciprocate according to a cycle subdivided into four periods, with a second period in the first coil corresponding to a fourth period in the second coil, whereby mechanical energy can be utilized during reciprocate movement in either direction to ensure a better power continuity.

10. In an alternator having at least one coil surrounded by a magnetic circuit for picking up electrical power from the alternator and having two ends, the coil cooperating with a magnetic moving part cyclically displaced between two positions to form a gap having a size dependent on instant position of the moving part, the improvement comprising:
    a substantially constant voltage power supply source having a positive and a negative terminal;
    two controlled valves, said two ends of said at least one coil being respectively connected to said positive terminal and to said negative terminal of said substantially constant voltage power supply source through respective ones of said controlled valves; and
    monodirectional current connections between each of said two ends of said at least one coil and opposite terminal of the power supply source;
    including means for supplying excitation pulses to the coil during from about 1% to about 10% of the total cycle of said moving part, said means being coupled to control electrodes of said valves to control conduction thereof with said pulses.

11. An improved alternator according to claim 10, wherein said means for supplying excitation pulses comprise excitation pulse producing means for producing pulses to effect a current flow in said coil substantially in phase with variation of reluctance originating from displacement of said moving part.

* * * * *